(12) United States Patent
Quigley (10) Patent No.: US 9,912,243 B2
(45) Date of Patent: Mar. 6, 2018

(54) REDUCING POWER IN A POWER CONVERTER WHEN IN A STANDBY MODE

(71) Applicant: Microchip Technology Incorporated, Chandler, AZ (US)

(72) Inventor: Thomas Quigley, Newark Valley, NY (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/168,390

(22) Filed: May 31, 2016

(65) Prior Publication Data

US 2016/0352237 A1  Dec. 1, 2016

Related U.S. Application Data

(60) Provisional application No. 62/169,415, filed on Jun. 1, 2015.

(51) Int. Cl.
*H02M 3/335* (2006.01)
*H02M 1/08* (2006.01)
(Continued)

(52) U.S. Cl.
CPC ......... *H02M 3/33546* (2013.01); *H02M 1/08* (2013.01); *H02M 1/36* (2013.01);
(Continued)

(58) Field of Classification Search
None
See application file for complete search history.

(56) References Cited

U.S. PATENT DOCUMENTS 4,967,332 A   10/1990  Claydon et al. ............... 363/17
5,498,995 A    3/1996  Szepesi et al. ............... 327/538
(Continued)

FOREIGN PATENT DOCUMENTS

DE   102008027054 A1   1/2009   ............ H02M 3/28
EP       0618665 A2   10/1994   ............ H02M 3/28
EP       2775602 A2    9/2014   ............ H02M 3/156

OTHER PUBLICATIONS

International Search Report and Written Opinion, Application No. PCT/US2016/035139, 13 pages, dated Aug. 30, 2016.
(Continued)

*Primary Examiner* — Jeffrey Gblende
(74) *Attorney, Agent, or Firm* — Slayden Grubert Beard PLLC (57) ABSTRACT

Power converters typically have unique circuitry for graceful start-up and to develop correct operating voltage biases. Typically this unique circuitry is incorporated into a primary-side "start-up" controller. This start-up controller can also be the primary means of control of the power converter once started. However, a secondary-side controller is typically needed for more exact output voltage regulation, duplicating circuitry already present in the primary-side start-up controller. During light-load or no load conditions, on and off switching of the gate driver is stopped when the secondary-side controller sends a standby code inhibit (disable) command to the start-up controller. When power needs to be sent to the secondary side of the transformer to charge a secondary side capacitor, the secondary-side controller sends an enable code command to the start-up controller where it is detect to allow the start-up controller to operate in a normal fashion with the secondary side controller.

26 Claims, 3 Drawing Sheets

(51) Int. Cl.
*H02M 1/36* (2007.01)
*H02M 1/00* (2006.01)

(52) U.S. Cl.
CPC ... *H02M 3/33507* (2013.01); *H02M 3/33515* (2013.01); *H02M 3/33523* (2013.01); *H02M 2001/0006* (2013.01); *H02M 2001/0009* (2013.01); *H02M 2001/0032* (2013.01); *H02M 2001/0035* (2013.01); *Y02B 70/16* (2013.01)

(56) References Cited

U.S. PATENT DOCUMENTS

| | | | | |
|---|---|---|---|---|
| 5,757,627 | A * | 5/1998 | Faulk | H02M 3/33576 363/21.14 |
| 6,456,511 | B1 | 9/2002 | Wong | 363/21.13 |
| 6,504,267 | B1 | 1/2003 | Giannopoulos | 307/31 |
| 7,746,672 | B2 | 6/2010 | Nishikawa | 363/21.16 |
| 9,331,583 | B2 | 5/2016 | Zhang et al. | |
| 2002/0006045 | A1 | 1/2002 | Shirai et al. | 363/17 |
| 2002/0125867 | A1 | 9/2002 | Choo et al. | 323/282 |
| 2007/0133234 | A1 | 6/2007 | Huynh et al. | 363/20 |
| 2008/0259655 | A1 | 10/2008 | Wei et al. | 363/21.18 |
| 2008/0265133 | A1 | 10/2008 | Sawtell et al. | 250/206 |
| 2009/0010027 | A1 | 1/2009 | Nishikawa | 363/21.01 |
| 2009/0261790 | A1 | 10/2009 | Arduini | 323/266 |
| 2009/0273324 | A1 | 11/2009 | Okamoto et al. | 323/282 |
| 2009/0295346 | A1 | 12/2009 | Matthews | 323/267 |
| 2009/0295349 | A1 | 12/2009 | Tao et al. | 323/282 |
| 2010/0194198 | A1 | 8/2010 | Djenguerian et al. | 307/31 |
| 2010/0308875 | A1 | 12/2010 | Fitzgerald | 327/142 |
| 2010/0327761 | A1 * | 12/2010 | Jin | H05B 41/2828 315/219 |
| 2011/0019446 | A1 | 1/2011 | Wu et al. | 363/79 |
| 2011/0032732 | A1 | 2/2011 | Hsu | 363/21.14 |
| 2011/0075448 | A1 | 3/2011 | Melanson | 363/20 |
| 2011/0103104 | A1 * | 5/2011 | Zhan | H02M 3/33507 363/21.17 |
| 2011/0164437 | A1 | 7/2011 | Sun et al. | 363/16 |
| 2011/0305043 | A1 | 12/2011 | Matsumoto | 363/21.01 |
| 2012/0099345 | A1 | 4/2012 | Zhao et al. | 363/21.05 |
| 2012/0139342 | A1 | 6/2012 | Bailey et al. | 307/31 |
| 2012/0139477 | A1 | 6/2012 | Oglesbee et al. | 320/107 |
| 2012/0230069 | A1 | 9/2012 | Tzeng et al. | 363/49 |
| 2012/0243271 | A1 | 9/2012 | Berghegger | 363/21.15 |
| 2012/0294048 | A1 | 11/2012 | Brinlee | 363/21.18 |
| 2013/0016535 | A1 | 1/2013 | Berghegger | 363/21.15 |
| 2013/0155728 | A1 | 6/2013 | Melanson et al. | 363/21.16 |
| 2013/0194020 | A1 * | 8/2013 | Shen | H03K 19/018528 327/333 |
| 2013/0229829 | A1 | 9/2013 | Zhang et al. | 363/16 |
| 2013/0236203 | A1 | 9/2013 | Nakajima et al. | 399/88 |
| 2013/0300384 | A1 | 11/2013 | Wang et al. | 323/271 |
| 2014/0028095 | A1 | 1/2014 | Maru et al. | 307/31 |
| 2014/0140107 | A1 | 5/2014 | Chen et al. | 363/21.15 |
| 2014/0160810 | A1 | 6/2014 | Zheng | 363/21.17 |
| 2014/0254214 | A1 | 9/2014 | Balakrishnan et al. | 363/21.15 |
| 2014/0254215 | A1 | 9/2014 | Brinlee et al. | 363/21.15 |
| 2014/0313790 | A1 | 10/2014 | Feng et al. | 363/21.02 |
| 2014/0321170 | A1 | 10/2014 | Tumasz | 363/21.09 |
| 2014/0369086 | A1 | 12/2014 | Hayasaki | 363/21.14 |
| 2015/0016152 | A1 | 1/2015 | Kojima | 363/21.02 |
| 2015/0124488 | A1 | 5/2015 | Dai et al. | 363/17 |
| 2015/0280573 | A1 | 10/2015 | Gong et al. | 363/21.14 |
| 2015/0280584 | A1 | 10/2015 | Gong et al. | 363/21.13 |
| 2016/0079878 | A1 | 3/2016 | Lin et al. | 363/21.14 |
| 2016/0087541 | A1 | 3/2016 | Xie et al. | 363/21.06 |
| 2016/0141951 | A1 | 5/2016 | Mao et al. | 363/21.02 |
| 2016/0149504 | A1 | 5/2016 | Quigley | |
| 2016/0190938 | A1 | 6/2016 | Wang et al. | 363/21.12 |
| 2016/0352231 | A1 | 12/2016 | Quigley | 363/21.03 |
| 2016/0352237 | A1 | 12/2016 | Quigley | 363/21.1 |
| 2017/0054376 | A1 | 2/2017 | Quigley | |

OTHER PUBLICATIONS

Microchip Technology Incorporated, "HV9910C: Universal High-Brightness LED Driver," URL: http://ww1.microchip.com/downloads/en/DeviceDoc/20005323A.pdf, 18 pages, Mar. 25, 2014.
International Search Report and Written Opinion, Application No. PCT/US2016/035149, 13 pages, dated Sep. 9, 2016.
U.S. Non-Final Office Action, U.S. Appl. No. 14/945,729, 36 pages, dated Mar. 29, 2017.
U.S. Notice of Allowance, U.S. Appl. No. 15/241,993, 22 pages, dated Apr. 5, 2017.
On Semiconductor, "NCP1249A/B + NCP4355B: Very Low No-Load Power Consumption Flyback Converter with Peak Power Excursion Evaluation Board User's Manual," XP055312861, URL: http://www.onsemi.com/pub/Collateral/EVBUM2221-D.pdf, 30 pages, Apr. 30, 2014.
International Search Report and Written Opinion, Application No. PCT/US2016/047949, 15 pages, dated Nov. 8, 2016.
"IEEE 802.3af PD with Current Mode Switching Regulator," Freescale Semiconductor, Document No. MC34670, URL: http://www.nxp.com/files/analog/doc/data_sheet/MC34670.pdf, 24 pages, Dec. 31, 2006.
International Search Report and Written Opinion, Application No. PCT/US2015/061769, 13 pages, dated Mar. 11, 2016.

* cited by examiner

REDUCING POWER IN A POWER CONVERTER WHEN IN A STANDBY MODE

RELATED PATENT APPLICATION

This application claims priority to commonly owned U.S. Provisional Patent Application No. 62/169,415; filed Jun. 1, 2015; and is related to U.S. patent application Ser. No. 14/945,729; filed Nov. 19, 2015; and U.S. Provisional Patent Application No. 62/208,123; filed Aug. 21, 2015; all are hereby incorporated by reference herein for all purposes.

TECHNICAL FIELD

The present disclosure relates to power converters, and, in particular, to reducing power used by the power converter when in a stand-by mode during light-load or no-load conditions.

BACKGROUND

Power converters, in particular switched-mode AC/DC power converters, typically have unique circuitry to reduce power used during light-load and no-load conditions. A power converter having a low power standby mode may be used to efficiently operate the power converter during light-load and no-load conditions. During this low power standby mode a secondary-side controller commands a start-up controller on the primary side of the power converter transformer to inhibit operation of the power switch coupled to the transformer primary. However, the secondary-side controller must use energy stored on the secondary side capacitor to continuously send control signals to the start-up controller for inhibiting operation of the power converter switch during this low power standby mode.

SUMMARY

Therefore a need exists for reducing power used when a power converter is in a low-power standby mode.

According to an embodiment, a method for reducing standby power in a power converter may comprise the steps of: providing a primary-side start-up controller and a secondary-side controller in a power converter; controlling a power switch coupled to a transformer in the power converter with the start-up controller until a secondary-side voltage from the transformer reaches a desired value then controlling the power switch by sending a pulse width modulation (PWM) signal from the secondary-side controller to the start-up controller; sending a disable signal from the secondary-side controller to the start-up controller to inhibit operation of the power switch and enter into a standby mode; and sending an enable signal from the secondary-side controller to the start-up controller to enable operation of the power switch and return to an operating mode.

According to a further embodiment of the method, the steps of sending the enable and disable signals may comprise the steps of sending the enable and disable signals over a first isolation circuit, and the step of sending the PWM signal may comprise the step of sending the PWM signal over a second isolation circuit. According to a further embodiment of the method, the steps of sending the enable, disable and PWM signals may comprise the steps of sending the enable, disable and PWM signals over a single isolation circuit.

According to a further embodiment of the method, the disable signal may comprise a first coded signal and the enable signal may comprise a second coded signal. According to a further embodiment of the method, the steps of decoding the first and second coded signals may comprise the steps of decoding the first and second coded signals in the primary-side start-up controller. According to a further embodiment of the method, the enable and disable signals may be at higher frequencies than the PWM signal frequencies. According to a further embodiment of the method, the enable and disable signals may be at frequencies of at least ten times the PWM signal frequencies. According to a further embodiment of the method, the enable and disable signals may be at frequencies of about 500 kHz plus or minus about 50 kHz, and the PWM signal may be at frequencies from about 20 kHz to about 65 kHz.

According to a further embodiment of the method, the step of filtering the higher frequency enable and disable signals from the PWM signal may comprise the step of using a high pass filter. According to a further embodiment of the method, the high pass filter may be a digital high pass filter. According to a further embodiment of the method, the high pass filter may be an analog high pass filter.

According to another embodiment, a power converter having reduced standby power may comprise: a start-up controller coupled to a first DC voltage; a transformer having primary and secondary windings, wherein the transformer primary winding may be coupled to the first DC voltage; a current measurement circuit for measuring current through the primary winding of the transformer and providing the measured primary winding current to the start-up controller; a power switch coupled to the transformer primary and controlled by the start-up controller; a secondary-side rectifier coupled to the transformer secondary winding for providing a second DC voltage; a secondary-side controller coupled to the start-up controller and the secondary-side rectifier; wherein when the start-up controller receives the first DC voltage it starts to control the power switch on and off whereby a current flows through the transformer primary, an AC voltage develops across the transformer secondary winding, the second DC voltage from the secondary side rectifier powers up the secondary-side controller, the secondary-side controller takes over control of the power switch when the second DC voltage reaches a desired voltage level by sending a pulse width modulation (PWM) signal from the secondary-side controller to the start-up controller, the secondary-side controller sends a disable signal to the start-up controller to inhibit operation of the power switch when entering into a standby mode, and the secondary-side controller sends an enable signal to the start-up controller to enable operation of the power switch and return to an operating mode.

According to a further embodiment, the enable and disable signals may be sent over a first isolation circuit, and the PWM signal may be sent over a second isolation circuit. According to a further embodiment, the enable, disable and PWM signals may be sent over a single isolation circuit. According to a further embodiment, the disable signal may comprise a first coded signal and the enable signal may comprise a second coded signal, and the start-up controller may further comprise decoding circuits for decoding the first and second coded signals. According to a further embodiment, the enable and disable signals may be at higher frequencies than the PWM signal frequencies. According to a further embodiment, the enable and disable signals may be at frequencies of at least ten times the PWM signal frequencies. According to a further embodiment, the enable and disable signals may be at frequencies of about 500 kHz plus or minus about 50 kHz, and the PWM signal may be at frequencies from about 20 kHz to about 65 kHz.

According to a further embodiment, a high pass filter may be used to filter out the PWM signal before the enable and disable signals may be decoded. According to a further embodiment, the power converter may comprise a flyback power converter. According to a further embodiment, the power converter may be selected from any one of the group consisting of a forward converter, an LLC converter, a half-bridge converter, a full-bridge converter, and a phase-shifted full-bridge converter.

According to a further embodiment, the power switch may be a power metal oxide semiconductor field effect transistor (MOSFET). According to a further embodiment, the isolation circuit may be an optical coupler. According to a further embodiment, the isolation circuit may be a pulse transformer. According to a further embodiment, the start-up controller may comprise an open-loop current regulator and power switch driver.

According to a further embodiment, the start-up controller may comprise: a high voltage regulator having an input coupled to the first DC voltage; over-voltage and under-voltage lockout circuits coupled to the high voltage regulator; a shutdown circuit coupled to the over-voltage and under-voltage lockout circuits; a pulse width modulation (PWM) generator; a gate driver for driving the power switch, where the gate driver may be coupled to the shutdown circuit; a PWM signal selection circuit coupled between the PWM generator, the gate driver and an external pulse input; a current protection circuit coupled to the PWM generator; an external command detection circuit adapted to detect a PWM signal on the external pulse input and to switch the gate driver from the PWM generator to the external pulse input; and enable/disable signal detection circuits coupled to an external enable/disable input and the shutdown circuit.

According to a further embodiment, the start-up controller may comprise: a high voltage regulator having an input coupled to the first DC voltage; over-voltage and under-voltage lockout circuits coupled to the high voltage regulator; a shutdown circuit coupled to the over-voltage and under-voltage lockout circuits; a pulse width modulation (PWM) generator; a gate driver for driving the power switch, where the gate driver may be coupled to the shutdown circuit; a PWM signal selection circuit coupled between the PWM generator, the gate driver and an external pulse input; a current protection circuit coupled to the PWM generator; an external command detection circuit adapted to detect a PWM signal on the external pulse input and to switch the gate driver from the PWM generator to the external pulse input; and enable/disable signal detection circuits coupled to the external pulse input and the shutdown circuit. According to a further embodiment, the start-up controller may be provided by a first microcontroller, and the secondary-side controller may be provided by a second microcontroller.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

Power supplies, in particular DC-to-DC and AC-to-DC power converters, typically have unique circuitry to start them up. According to various embodiments of this disclosure, a power converter may comprise a primary-side start-up controller and a secondary-side controller, wherein the start-up controller is utilized to send power to the secondary-side controller when power (voltage) is first applied to the primary side of the power converter. This provides a low cost integrated circuit (IC) solution for start-up of DC-to-DC and AC-to-DC power converters using conventional devices on the primary side that does not duplicate the resources of a secondary-side controller and minimizes discrete components on the primary side. More detailed descriptions of the implementation and operation of power converters, according to the teachings of this disclosure, are provided in commonly owned U.S. patent application Ser. No. 14/945,729; filed Nov. 19, 2015; entitled "Start-Up Controller for a Power Converter," by Thomas Quigley, and is hereby incorporated by reference herein for all purposes.

A "burst-mode" may be used to efficiently operate the power converter during light-load and no-load conditions, e.g., when the power converter is in a "standby mode." According to various embodiments disclosed herein, circuitry may be provided in a start-up controller located on the primary-side of the power converter that latches enabling and disabling of power switch drive via digitally coded commands from a secondary-side controller via an isolation circuit. Therefore power switch drive disabling commands need not be continuously sent from the secondary-side controller to the primary-side start-up controller, thereby saving power used by the power converter when in a standby mode.

Referring now to the drawings, the details of example embodiments are schematically illustrated. Like elements in the drawings will be represented by like numbers, and similar elements will be represented by like numbers with a different lower case letter suffix.

Figure 1:
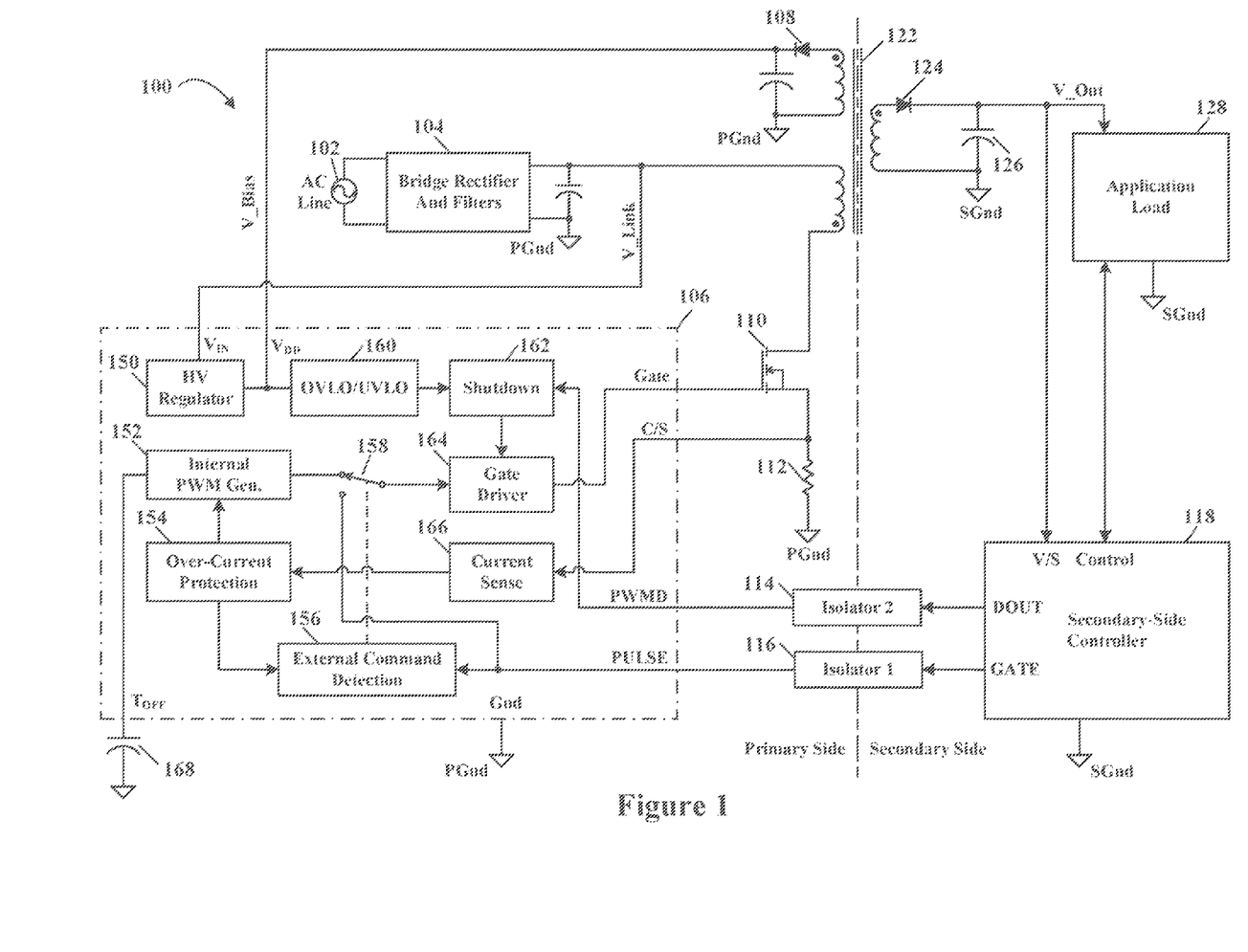
FIG. 1 illustrates a schematic block diagram of a power converter that is adapted for reducing standby power draw, according to the teachings of this disclosure.

Referring now to FIG. 1, depicted is a schematic block diagram of a power converter that is adapted for reducing standby power draw, according to the teachings of this disclosure. A power converter, generally represented by the numeral 100, may comprise a start-controller 106, a MOSFET switch 110, a current sensor 112, e.g., a resistor; a transformer 122, a bias voltage rectifier 108, a power rectifier 124, a filter capacitor 126, a secondary-side controller 118, and isolation circuits 114 and 116. The power rectifier 124 and filter capacitor 126 may be coupled to an application load 128. A flyback power converter is shown for explanatory purposes but it is contemplated and within the scope of this disclosure that any configuration of a power converter used in switched mode power supplies, e.g., forward converter, LLC (combination of two inductors and one capacitor) converter, half-bridge converter, full-bridge converter, phase-shifted full-bridge converter and the like, may utilize and benefit from what is disclosed and claimed herein.

The start-up controller 106 may be a pulse width modulation (PWM) source open-loop, peak current-mode controller operating with a fixed OFF-time and comprise a high voltage (HV) regulator 150, an internal PWM generator 152, over-current protection 154, external command detection 156, a PWM source selection switch 158, over-voltage and under-voltage lockout 160, shutdown circuit 162, a MOSFET gate driver 164, and a current sense circuit 166.

When an AC line power source 102 is applied to the primary side power rectifier and filters 104 a DC voltage, V_Link, results. This DC voltage, V_Link, is coupled to a primary winding of transformer 122 and the VIN input of the start-up controller 106. The start-up controller 106 becomes active when the voltage, V_Link, reaches a sufficient voltage for proper operation thereof. Once activated the start-up controller 106 starts pulsing the MOSFET gate driver 164 which turns on and off the MOSFET switch 110 thereby allowing the transformer 122 of the flyback power converter 100 to convert energy to its secondary side and bias voltage windings. The start-up controller 106 is not a primary-side power converter controller that can linearly regulate the output of the flyback power converter 100 via transformer coupling. It does not duplicate the precision reference and voltage error amplifier of the secondary-side controller 118.

The start-up controller 106 basically has two modes of operation: In the first mode, during start-up of the flyback power converter 100, it performs as an open-loop current regulator that drives the MOSFET switch 110 until the secondary-side controller 118 takes control (command) of the PWM signals that drive the MOSFET switch 110. In the second mode, once the secondary-side controller 118 is fully operational, it starts sending PWM signal commands to the start-up controller 106 through the isolation circuit 116. Once external PWM signal commands from the secondary-side controller 118 (via isolation circuit 116) are received by the start-up controller 106, its internal gate driver 164 may be coupled to the external PWM signal, whereby the secondary-side controller 118 now controls the MOSFET switch 110.

The start-up controller 106 controls the switching of the MOSFET switch 110 in an open-loop manner based upon regulation of the peak current through the MOSFET switch 110. A voltage is developed across resistor 112 in series with the MOSFET switch 110 and primary of the transformer 122 that is proportional to the peak current therethrough. This voltage is coupled to the C/S (current sense) input of the start-up controller 106 which senses it and adjusts the on time of the MOSFET switch 110 to limit the peak current to a certain design value. An internal high voltage linear regulator 150 in the start-up controller 106, whose input is the DC voltage, V_Link, regulates a voltage, $V_{DD}$, usable by the internal circuits of the start-up converter 106. $V_{DD}$ is the peak voltage at the Gate node of the start-up controller 106. Initially, the internal linear regulator supplies $V_{DD}$ for operation of the start-up controller 106, but once a DC voltage is provided from a primary-side tertiary winding of the transformer 122 through the power diode 108 this internal linear regulator 150 stops supplying current to the internal circuits of the start-up controller 106. This allows internal thermal dissipation in the start-up controller 106 to be reduced.

Driving the MOSFET switch 110 on and off will cause the transformer 122 through rectifier 124 to charge a capacitor 126 to a voltage, V_Out. The secondary-side controller 118 of the power converter 100 is located on the secondary side, and when there is sufficient voltage, V_Out, on the filter capacitor 126, the secondary side controller 118 becomes active and takes over controlling the gate driver 164 through the isolation circuit 116, e.g., optical-coupler, pulse transformer, etc. The external command detection 156 senses the PWM pulses from the isolation circuit 116 and will cause the PWM selection switch 158 to switch over from the internal PWM generator 152 to the PWM pulses from the secondary-side controller 118.

The transformer 122 also provides bias voltage, V_Bias, via diode 108. V_Bias may be cross-regulated to the start-up controller 106 by transformer coupling. The winding turns ratio of the transformer 122 is such that V_Bias is higher than the output voltage set point of the internal linear voltage regulator 150 of the start-up controller 106, thereby effectively shutting off this internal linear voltage regulator 150 and reducing the internal thermal dissipation of thereof.

When the power converter 100 goes into a low power standby mode, the PWM pulses from the secondary-side controller 118 stop. However when that happens the start-up controller 106 thinks that it is in the start-up mode and will force the switch 158 to reconnect the internal PWM generator 152 to the gate driver 164. This is not desired when going into a low power standby mode. To prevent the start-up controller 106 from becoming active again to drive the MOSFET switch 110, the secondary-side controller 118 may assert a hold or standby signal on the PWMD (PWM disable) input to the start-up controller 106 via a second isolation circuit 114 coupled to a digital output from the secondary-side controller 118. The secondary-side controller 118 holds the PWM disable signal for as long as the low power standby mode is in effect or until a voltage on the filter capacitor drops below a certain value and the secondary-side controller 118 needs for the start-up controller 106 to become active again long enough to recharge the filter capacitor 126.

However by requiring the secondary-side controller 118 to actively maintain a PWM disable signal on the PWMD input to the start-up controller 106, power is consumed and the filter capacitor 126 will discharge faster than necessary during the low power standby mode. Over time the secondary-side controller 118 will have to come out of the low power sleep mode and then re-enable the start-up controller 106 in order to refresh the voltage charge on the filter capacitor 126, then and only then can the secondary-side controller 118 go back into the low power sleep mode. Therefore what is needed is a way to eliminate the secondary-side controller having to maintain a PWM disable signal to the start-up controller 106, and thereby stay for a longer period of time in a low power sleep mode.

Figure 2:
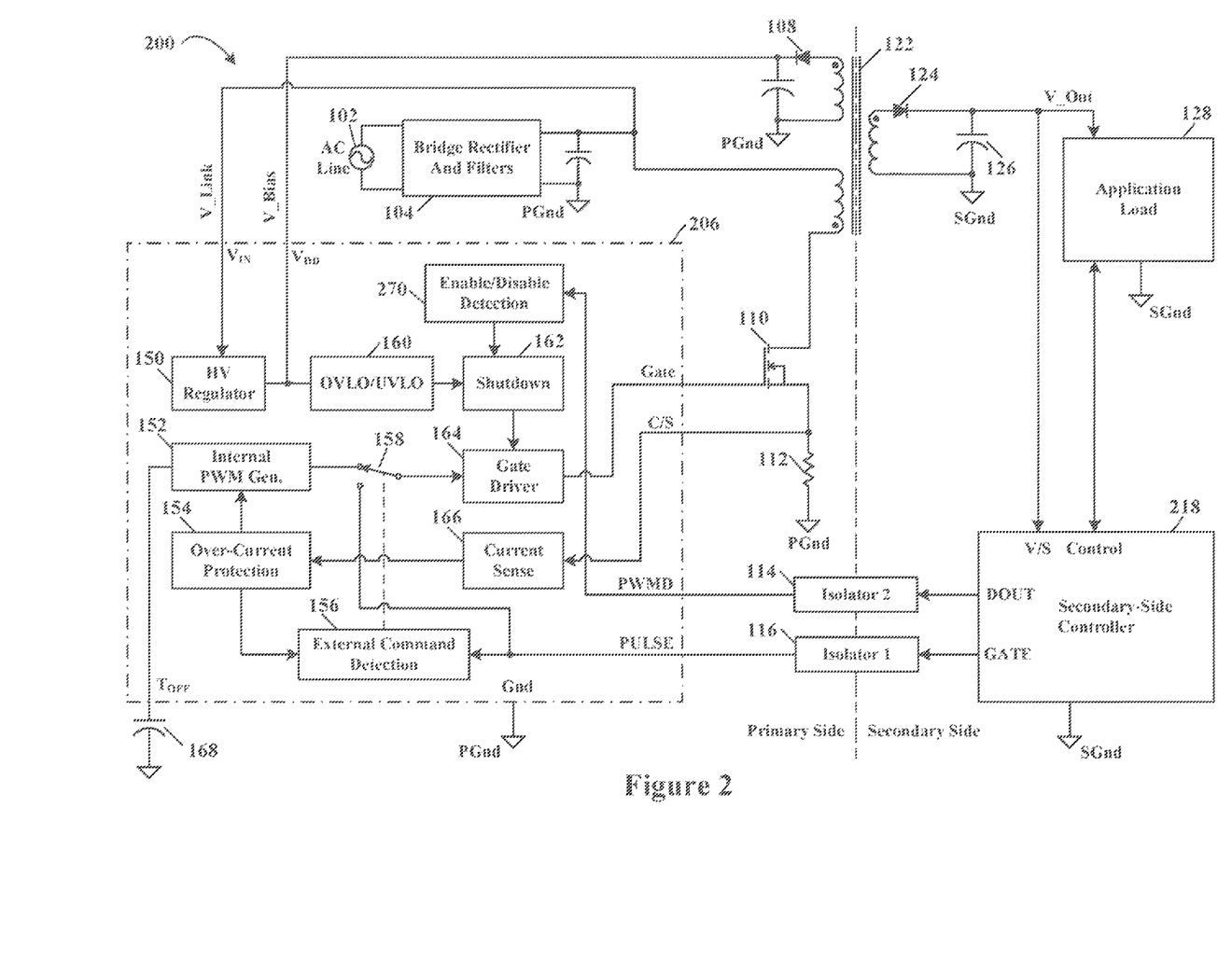
FIG. 2 illustrates a schematic block diagram of a power converter that is adapted for reducing standby power draw, according to a specific example embodiment of this disclosure.

Referring now to FIG. 2, depicted is a schematic block diagram of a power converter that is adapted for reducing standby power draw, according to a specific example embodiment of this disclosure. A power converter, generally represented by the numeral 200, works in substantially the same way as the power converter 100 described hereinabove except for the addition of a sleep command detection circuit 270 in the start-up controller 206, and different shutdown and enable protocols from the secondary-side controller 218. Now when the secondary-side controller 218 wants to go into a low power sleep mode its Gate output will be held so that there are no PWM pulses sent to the start-up controller 206 and a brief coded shutdown command is sent to the start-up controller 206 via the isolation circuit 114. Then the secondary-side controller 218 goes into a passive (no signals generated) low power sleep mode that draws minimal current from the filter capacitor 126. When the secondary-side controller 218 wakes up to either recharge the filter capacitor 126 or start supplying load current again to the application load 128, it asserts a brief coded enable command via the isolation circuit 114 to the start-up controller 206, the sleep command detection circuit 270 decodes the enable command, and the start-up controller 206 then resumes normal operation with PWM pulses from the secondary-side controller via the isolation circuit 116. By latching the start-up controller 206 into a standby sleep mode the secondary-side controller 218 no long has to continuously drive the PWMD input of the start-up controller 206 via the isolation circuit 114. Thus the secondary-side controller 218 consumes less energy (lower current draw) from the filter capacitor 126.

Figure 3:
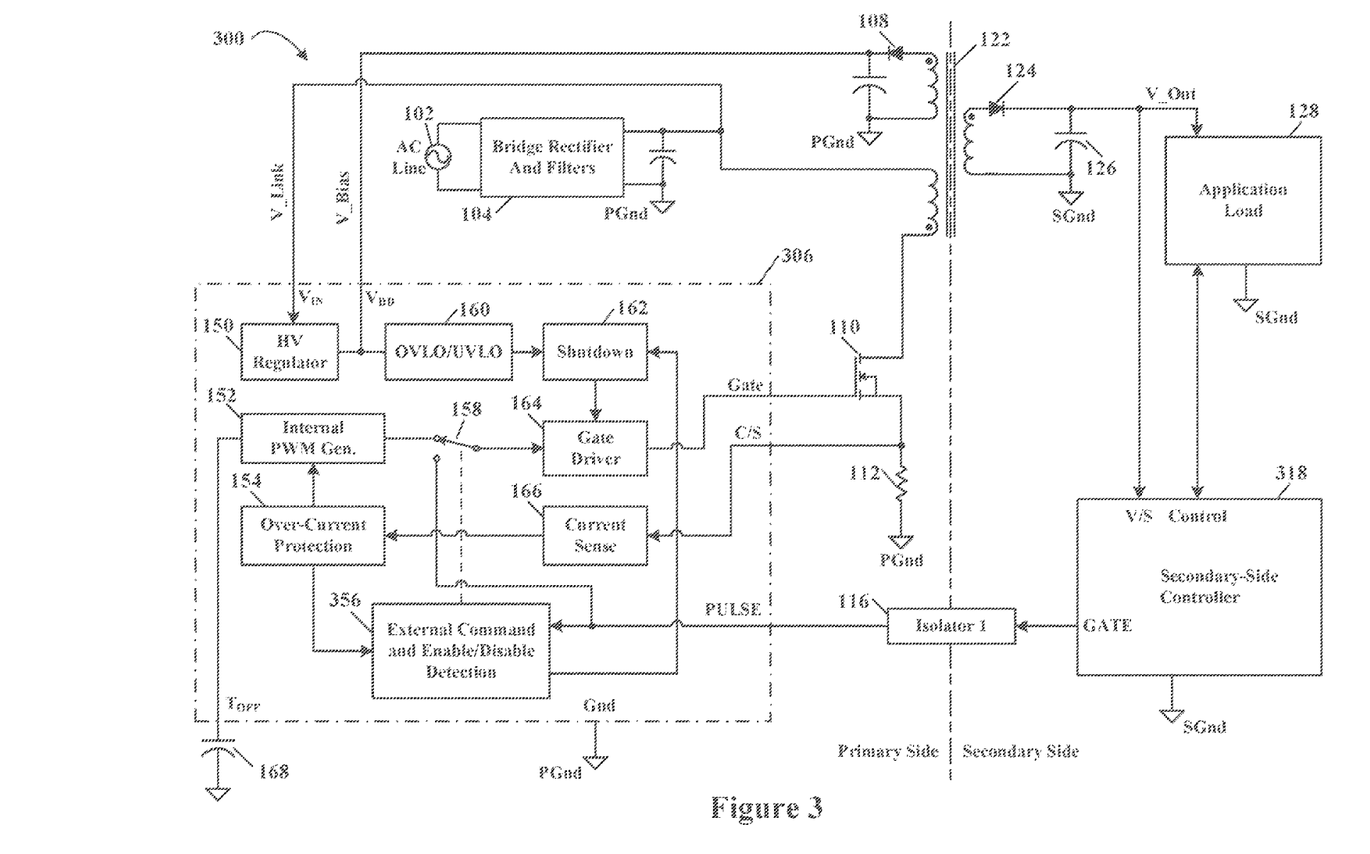
FIG. 3 illustrates a schematic block diagram of a power converter that is adapted for reducing standby power draw, according to another specific example embodiment of this disclosure.

Referring now to FIG. 3, depicted is a schematic block diagram of a power converter that is adapted for reducing standby power draw, according to another specific example embodiment of this disclosure. A power converter, generally represented by the numeral 300, works in substantially the same way as the power converter 200 described hereinabove except that the sleep command detection circuit 270 and the second isolation circuit 114 have been eliminated, and the required integrated circuit package pin count has been reduce from eight (8) pins to seven (7) pins, thus leaving one spare pin available for other purposes.

The external command detection 356 is now used to detect normal operating PWM pulses, and disable and enable commands from the secondary-side controller 318 via the isolation circuit 116. The operating PWM pulses, and the disable and enable commands are multiplexed on the signal line from the gate output of the secondary-side controller 318 to the Pulse input of the start-up controller 306. To multiplex the operating PWM pulses, and the disable and enable commands on the same signal line, different pulse frequencies are used. For example, an allowable PWM pulse stream frequency range may be from about 20 kHz to about 65 kHz. An allowable frequency range for the disable and enable commands may be about 500 kHz plus or minus about 50 kHz. Since the operating PWM pulse stream or the disable and enable commands are mutually exclusive (do not occur at the same time), the external command detection 356 need only differentiate between the frequencies of the pulses it receives, e.g., ignores the lower frequency PWM pulses when detecting the enable/disable signals, and will only react to the high frequency disable and enable commands. For that differentiation a simple high pass or frequency selective filter, either analog or digital (preferably digital), need be employed A simple analog high-pass filter can be described as having two components; a capacitor (from input to output) and a resistor (output to ground). The resistance value and the capacitance value determine the 'break frequency'. The break frequency can be described as the frequency when half the input signal amplitude is present at the output. This is also known as the "3 dB breakpoint". So, in this application the normal PWM frequency is much lower than the 3 dB breakpoint (output of filter is near zero amplitude signal) and the sleep command "burst frequency" is much higher than the 3 dB breakpoint (output is nearly 100% of the input amplitude). The difference in amplitude allows simple circuitry to easily distinguish the two signal types. A simple digital filter would be a set of shift registers in series. The high frequency "burst" could be at 500 kHz and have a 50% duty cycle. 500 kHz has a period of 2 µs. Say, for instance, the rising edge of the 500 kHz signal sets the first resister from a 0 to a 1 state, and it also triggers a timer of, say, 2.2 µs in duration. If the next rising edge appears before the end of the timer's 2.2 µs duration, then both the first and second registers of the series are set to "1". Say there are 5 shift resisters in series. When all 5 are at "1" then the circuitry determines that a valid sleep command has been issued. If at any time the 2.2 µs goes its entire duration without the next rising edge, then the signal is determined not to be a "sleep" command and the detection circuit is reset.

Now when the secondary-side controller 318 wants to go into a low power sleep mode it will issue a "high frequency burst" disable command to the Pulse input of the start-up controller 306 via the single isolation circuit 116. The external command detection 356 will detect this high frequency burst disable command and hold the shutdown circuit 162 in a standby sleep condition which inhibits the gate driver 164 from pulsing the MOSFET switch 110 on and off (maintains MOSFET switch 110 off). Then the secondary-side controller 318 goes into a passive (no PWM drive signals generated) low power sleep mode that draws minimal current from the filter capacitor 126.

Detection of the "high frequency burst" disable command takes a finite number of cycles before the disable command may be recognized by the external command detection 356. Therefore, the external MOSFET switch 110 will be gated at the "high frequency burst" frequency that may cause the power converter 300 to a enter into a "continuous conduction mode (CCM)" of operation. The current protection 154 will protect the power converter 300 from a CCM condition, but does not prevent the external command detection 356 from taking sufficient time to recognize the "high frequency burst" disable command.

The secondary-side controller 318 may "wake" to refresh filter capacitor 126 to then return to "sleep" mode. It can send a single pulse to the Pulse input of the start-up controller 306 via the single isolation circuit 116 which allows the Start-Up Function of the start-up controller 306 to function. Or, the secondary-side controller 318 may send a normal PWM signal to the Pulse input of the start-up controller 306 via the single isolation circuit 116 and control the recharge itself. Either way, once the capacitors are refreshed the secondary-side controller 318 may issue the "high frequency burst" to return to sleep. The secondary-side controller 318 may "wake" to start supplying load current again to the application load 128. It does this by resuming a normal PWM command to the PULSE input of the start-up controller 306 via the single isolation circuit 116. If the secondary-side controller 318 allows "sleep" to occur for too long a period then the voltage on the $V_{DD}$ pin of the start-up controller 306 will eventually decay below the UVLO level set by OVLP/UVLO circuit 160, which enables the start-up controller 306 to enter a start-up mode. The secondary-side controller 318 monitors the rise of voltage on V_Out to determine that the start-up controller 306 has awaken and is in start-up mode, and then awakens itself to regain control (to either re-enter sleep mode or continue normal operation). In this way there is always a strategy to exit the sleep mode state.

It is contemplated and within the scope of this disclosure that the control methods described and claimed herein may be used with other configurations of power converters used in switched mode power supplies, e.g., flyback power converter, forward converter, LLC converter, half-bridge converter, full-bridge converter, phase-shifted full-bridge converter and the like.

The invention claimed is:

1. A method for reducing standby power in a power converter, said method comprising the steps of:
   providing a primary-side start-up controller and a secondary-side controller in a power converter;
   controlling a power switch coupled to a transformer in the power converter with the start-up controller until a secondary-side voltage from the transformer reaches a desired value then controlling the power switch by sending a pulse width modulation (PWM) signal from the secondary-side controller to the start-up controller;
   sending a disable signal from the secondary-side controller to the start-up controller to inhibit operation of the power switch and enter into a standby mode; and
   sending an enable signal from the secondary-side controller to the start-up controller to enable operation of the power switch and return to an operating mode;
   wherein:
      the disable signal comprises a first coded signal and the enable signal comprises a second coded signal; and
      the method further comprises the step of decoding the first and second coded signals with decoding circuits in the primary-side start-up controller.

2. The method according to claim 1, wherein the steps of sending the enable and disable signals comprise the steps of sending the enable and disable signals over a first isolation circuit, and the step of sending the PWM signal comprises the step of sending the PWM signal over a second isolation circuit.

3. The method according to claim 1, wherein the steps of sending the enable, disable and PWM signals comprise the steps of sending the enable, disable and PWM signals over a single isolation circuit.

4. The method according to claim 3, wherein the enable and disable signals are at higher frequencies than the PWM signal frequencies.

5. The method according to claim 3, wherein the enable and disable signals are at frequencies of at least ten times the PWM signal frequencies.

6. The method according to claim 3, wherein the enable and disable signals are at frequencies of about 500 kHz plus or minus about 50 kHz, and the PWM signal are at frequencies from about 20 kHz to about 65 kHz.

7. A method for reducing standby power in a power converter, said method comprising the steps of:
   providing a primary-side start-up controller and a secondary-side controller in a power converter;
   controlling a power switch coupled to a transformer in the power converter with the start-up controller until a secondary-side voltage from the transformer reaches a desired value then controlling the power switch by sending a pulse width modulation (PWM) signal from the secondary-side controller to the start-up controller;
   sending a disable signal from the secondary-side controller to the start-up controller to inhibit operation of the power switch and enter into a standby mode; and
   sending an enable signal from the secondary-side controller to the start-up controller to enable operation of the power switch and return to an operating mode;
   wherein:
      the steps of sending the enable, disable and PWM signals comprise the steps of sending the enable, disable and PWM signals over a single isolation circuit;
      the enable and disable signals are at higher frequencies than the PWM signal frequencies; and
      the method further comprises the step of filtering the higher frequency enable and disable signals from the PWM signal with a high pass filter.

8. The method according to claim 7, wherein the high pass filter is a digital high pass filter.

9. The method according to claim 7, wherein the high pass filter is an analog high pass filter.

10. A power converter having reduced standby power, comprising:
   a start-up controller coupled to a first DC voltage;
   a transformer having primary and secondary windings, wherein the transformer primary winding is coupled to the first DC voltage;
   a current measurement circuit for measuring current through the primary winding of the transformer and providing the measured primary winding current to the start-up controller;
   a power switch coupled to the transformer primary and controlled by the start-up controller;
   a secondary-side rectifier coupled to the transformer secondary winding for providing a second DC voltage;
   a secondary-side controller coupled to the start-up controller and the secondary-side rectifier;
   wherein
   when the start-up controller receives the first DC voltage it starts to control the power switch on and off whereby a current flows through the transformer primary,
   an AC voltage develops across the transformer secondary winding,
   the second DC voltage from the secondary side rectifier powers up the secondary-side controller,
   the secondary-side controller takes over control of the power switch when the second DC voltage reaches a desired voltage level by sending a pulse width modulation (PWM) signal from the secondary-side controller to the start-up controller,
   the secondary-side controller sends a disable signal to the start-up controller to inhibit operation of the power switch when entering into a standby mode, and
   the secondary-side controller sends an enable signal to the start-up controller to enable operation of the power switch and return to an operating mode;
   wherein the disable signal comprises a first coded signal and the enable signal comprises a second coded signal, and the start-up controller further comprises decoding circuits for decoding the first and second coded signals.

11. The power converter according to claim 10, wherein the enable and disable signals are sent over a first isolation circuit, and the PWM signal is sent over a second isolation circuit.

12. The power converter according to claim 10, wherein the enable, disable and PWM signals are sent over a single isolation circuit.

13. The power converter according to claim 10, wherein the enable and disable signals are at higher frequencies than the PWM signal frequencies.

14. The power converter according to claim 13, wherein the enable and disable signals are at frequencies of at least ten times the PWM signal frequencies.

15. The power converter according to claim 13, wherein the enable and disable signals are at frequencies of about 500 kHz plus or minus about 50 kHz, and the PWM signal are at frequencies from about 20 kHz to about 65 kHz.

16. The power converter according to claim 13, further comprising a high pass filter to filter out the PWM signal before the enable and disable signals are decoded.

17. The power converter according to claim 10, wherein the power converter comprises a flyback power converter.

18. The power converter according to claim 10, wherein the power converter is selected from any one of the group consisting of a forward converter, an LLC converter, a half-bridge converter, a full-bridge converter, and a phase-shifted full-bridge converter.

19. The power converter according to claim 10, wherein the power switch is a power metal oxide semiconductor field effect transistor (MOSFET).

20. The power converter according to claim 12, wherein the isolation circuit is an optical coupler.

21. The power converter according to claim 12, wherein the isolation circuit is a pulse transformer.

22. The power converter according to claim 10, wherein the start-up controller comprises an open-loop current regulator and power switch driver.

23. The power converter according to claim 10, wherein the start-up controller is provided by a first microcontroller, and the secondary-side controller is provided by a second microcontroller.

24. A power converter having reduced standby power, comprising:
   a start-up controller coupled to a first DC voltage;
   a transformer having primary and secondary windings, wherein the transformer primary winding is coupled to the first DC voltage;
   a current measurement circuit for measuring current through the primary winding of the transformer and providing the measured primary winding current to the start-up controller;
   a power switch coupled to the transformer primary and controlled by the start-up controller;
   a secondary-side rectifier coupled to the transformer secondary winding for providing a second DC voltage;
   a secondary-side controller coupled to the start-up controller and the secondary-side rectifier;
   wherein:
      when the start-up controller receives the first DC voltage it starts to control the power switch on and off whereby a current flows through the transformer primary;
      an AC voltage develops across the transformer secondary winding;
      the second DC voltage from the secondary side rectifier powers up the secondary-side controller;
      the secondary-side controller takes over control of the power switch when the second DC voltage reaches a desired voltage level by sending a pulse width modulation (PWM) signal from the secondary-side controller to the start-up controller;
      the secondary-side controller sends a disable signal to the start-up controller to inhibit operation of the power switch when entering into a standby mode;
      the secondary-side controller sends an enable signal to the start-up controller to enable operation of the power switch and return to an operating mode;
      the start-up controller comprises:
         a high voltage regulator having an input coupled to the first DC voltage;
         over-voltage and under-voltage lockout circuits coupled to the high voltage regulator;
         a shutdown circuit coupled to the over-voltage and under-voltage lockout circuits;
         a pulse width modulation (PWM) generator;
         a gate driver for driving the power switch, where the gate driver is coupled to the shutdown circuit;
         a PWM signal selection circuit coupled between the PWM generator, the gate driver and an external pulse input;
         a current protection circuit coupled to the PWM generator;
         an external command detection circuit adapted to detect a PWM signal on the external pulse input and to switch the gate driver from the PWM generator to the external pulse input; and
         enable/disable signal detection circuits coupled to the shutdown circuit.

25. The power converter according to claim 24, wherein the enable/disable signal detection circuits are further coupled to an external enable/disable input.

26. The power converter according to claim 24, wherein the enable/disable signal detection circuits are further coupled to the external pulse input.

* * * * *